United States Patent
Benny et al.

(10) Patent No.: US 11,936,757 B1
(45) Date of Patent: Mar. 19, 2024

(54) PULL-BASED ON-DEMAND APPLICATION DEPLOYMENT TO EDGE NODE

(71) Applicant: Rafay Systems, Inc., Sunnyvale, CA (US)

(72) Inventors: Stephan Benny, Pleasanton, CA (US); Bheema Sarat Chandra Kaki, Milpitas, CA (US); Haseeb Siddique Budhani, Menlo Park, CA (US); Chaitanya Srikrishna Angadala, San Jose, CA (US); Shashank Krishna Pachava, San Antonio, TX (US)

(73) Assignee: Rafay Systems, Inc., Sunnyvale, CA (US)

( * ) Notice: Subject to any disclaimer, the term of this patent is extended or adjusted under 35 U.S.C. 154(b) by 0 days.

(21) Appl. No.: 17/740,348

(22) Filed: May 9, 2022

Related U.S. Application Data

(60) Provisional application No. 63/336,797, filed on Apr. 29, 2022.

(51) Int. Cl.
*H04L 67/60* (2022.01)
*H04L 61/4541* (2022.01)
*H04L 67/51* (2022.01)

(52) U.S. Cl.
CPC .......... *H04L 67/60* (2022.05); *H04L 61/4541* (2022.05); *H04L 67/51* (2022.05)

(58) Field of Classification Search
CPC ...... H04L 67/60; H04L 67/51; H04L 61/4541
(Continued)

(56) References Cited

U.S. PATENT DOCUMENTS

| 5,630,129 A | 5/1997 | Wheat |
| 6,167,438 A | 12/2000 | Yates et al. |

(Continued)

FOREIGN PATENT DOCUMENTS

| WO | 2013085703 | 6/2013 |
| WO | 2014071094 | 5/2014 |

(Continued)

OTHER PUBLICATIONS

"Pods", Kubernetes Documentation, [Online] Retrieved from the Internet: URL: https: kubernetes.io docs concepts workloads pods pod , (Retrieved on Mar. 11, 2019), 9 pgs.

(Continued)

*Primary Examiner* — Zi Ye
(74) *Attorney, Agent, or Firm* — Schwegman, Lundberg & Woessner, P.A.

(57) ABSTRACT

A method is provided method to control deployment of an application over a network in response to a client request sent over the network to access the application comprising: capturing at one or more first computing machines coupled to the network, an identifier of the requested application from the client request; sending information over the network from the one or more first computing machines coupled to the network to one or more second machines coupled to the network, wherein the information identifies the requested application and identifies a network address of an edge node at which to deploy the requested application; receiving the information at the one or more second machines coupled to the network; and causing by the one or more second machines coupled to the network, deployment of the application over the network to the edge node at the identified network address, based at least in part upon the received information.

21 Claims, 17 Drawing Sheets

(58) Field of Classification Search
USPC .......................................................... 709/219
See application file for complete search history.

(56) References Cited

U.S. PATENT DOCUMENTS

| | | | |
|---|---|---|---|
| 6,185,601 B1 | 2/2001 | Wolff | |
| 6,754,699 B2 | 6/2004 | Swildens et al. | |
| 6,823,377 B1 | 11/2004 | Wu et al. | |
| 7,236,799 B2 | 6/2007 | Wilson et al. | |
| 7,426,546 B2 | 9/2008 | Breiter et al. | |
| 7,523,181 B2 | 4/2009 | Swildens et al. | |
| 7,590,984 B2 | 9/2009 | Kaufman et al. | |
| 8,296,434 B1 | 10/2012 | Miller et al. | |
| 8,626,946 B2 | 1/2014 | Kamath et al. | |
| 8,745,221 B1 | 6/2014 | Willbanks | |
| 8,949,428 B2 | 2/2015 | Dow et al. | |
| 8,972,986 B2 | 3/2015 | Palanisamy et al. | |
| 9,075,657 B2 | 7/2015 | Jackson | |
| 9,197,549 B2 | 11/2015 | Kumar et al. | |
| 9,317,336 B2 | 4/2016 | Alicherry | |
| 9,537,973 B2 | 1/2017 | Batrouni et al. | |
| 9,584,423 B2 | 2/2017 | Deshmukh | |
| 9,680,708 B2 | 6/2017 | Kasturi | |
| 9,979,657 B2 | 5/2018 | Batrouni et al. | |
| 10,025,627 B2 | 7/2018 | Ferris | |
| 10,120,669 B2 | 11/2018 | Karagiannis et al. | |
| 10,365,977 B1 | 7/2019 | Gould et al. | |
| 10,791,168 B1 | 9/2020 | Dilley et al. | |
| 2002/0067831 A1* | 6/2002 | Zhu | H04L 63/0428 380/272 |
| 2005/0256971 A1 | 11/2005 | Colrain et al. | |
| 2007/0038994 A1* | 2/2007 | Davis | H04L 67/10 717/174 |
| 2008/0140840 A1 | 6/2008 | Hamilton et al. | |
| 2012/0131181 A1 | 5/2012 | Birkler et al. | |
| 2013/0080626 A1* | 3/2013 | Thireault | H04L 41/0806 709/224 |
| 2014/0089459 A1 | 3/2014 | Werr | |
| 2014/0136545 A1* | 5/2014 | Calo | G06F 16/2246 707/743 |
| 2015/0288597 A1 | 10/2015 | Wang et al. | |
| 2016/0189444 A1 | 6/2016 | Madhok et al. | |
| 2017/0134520 A1 | 5/2017 | Abbasi et al. | |
| 2017/0208138 A1* | 7/2017 | Baxter | H04L 41/5051 |
| 2018/0167483 A1 | 6/2018 | Cannon et al. | |
| 2020/0050494 A1 | 2/2020 | Bartfai-Walcott et al. | |
| 2021/0042160 A1* | 2/2021 | Alamouti | G06F 9/5011 |
| 2021/0075892 A1* | 3/2021 | Chun | H04L 69/163 |

FOREIGN PATENT DOCUMENTS

| | | |
|---|---|---|
| WO | 2015036943 | 3/2015 |
| WO | 2016079633 | 5/2016 |
| WO | 2018144060 | 8/2018 |

OTHER PUBLICATIONS

"What is Kubernetes?", Kubernetes Documentation, [Online] Retrieved from the Internet: URL: https: kubernetes.io docs concepts overview what-is-kubernetes , (Retrieved on Mar. 11, 2019), 6 pgs.

"Kubernetes Components", Kubernetes, [Online] Retrieved from the Internet: URL: https: kubernetes.io docs concepts overview components , (Feb. 21, 2022), 4 pgs.

"Kubernetes Architecture", Aqua, [Online] Retrieved from the Internet: URL: https: www.aquasec.com cloud-native-academy kubernetes-101 kubernetes-architecture , (Retrieved on Apr. 20, 2022), 22 pgs.

"What is a DNS CNAME record?", Cloudflare, [Online] Retrieved from the Internet: URL: https: www.cloudflare.com earning dns dns-records dns-cname-record , (Retrieved on Apr. 28, 2022), 3 pgs.

"What is DNS? | How DNS works", Cloudflare, [Online] Retrieved from the Internet: URL: https: www.cloudflare.com learning dns what-is-dns , (Retrieved on Apr. 23, 2022), 11 pgs.

"Container Images: Architecture and Best Practices", Aqua, [Online] Retrieved from the Internet: URL: https: www.aquasec.com cloud-native-academy container-security container-images , (Retrieved on Apr. 20, 2022), 11 pgs.

Gaun, Chris, "Introducing Mesosphere Kubernetes Engine (MKE)", D2IQ Blog, [Online] Retrieved from the Internet: URL: https: d2iq.com blog introducing-mesosphere-kubernetes-engine-mke, (Oct. 26, 2018), 7 pgs.

* cited by examiner

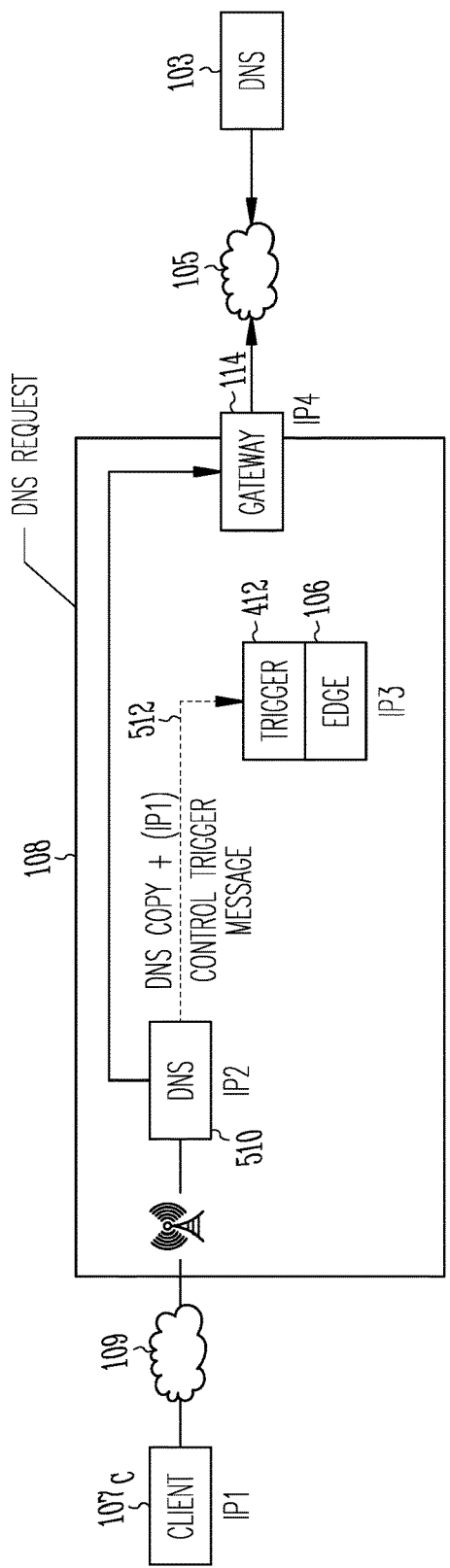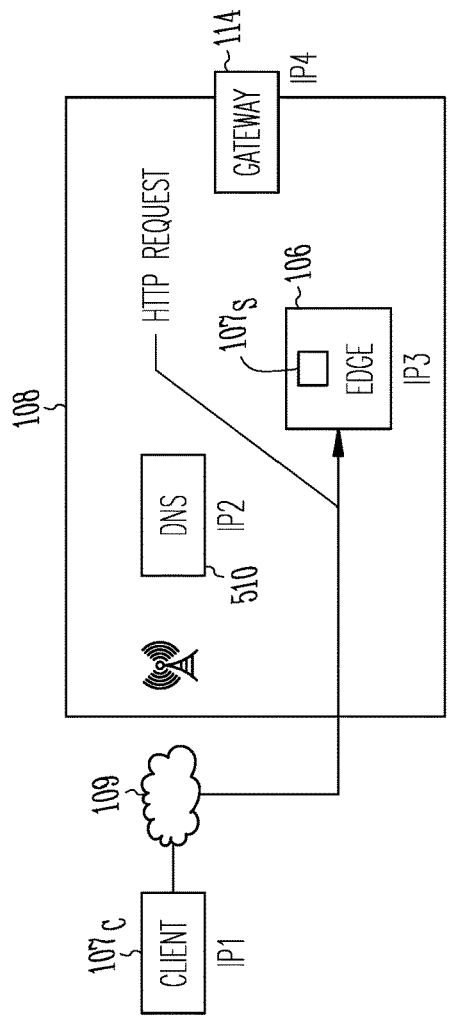

| | RECORD TYPE | VALUE | TTL |
|---|---|---|---|
| abc-com.deploy.dev | @ CNAME | is an alias of abc.com | 32600 |

| | |
|---|---|
| abc.com | IP1, IP2 |

CNAME-RECORDS

| | |
|---|---|
| abc-com.deploy.dev | abc.com |
| def-com.deploy.dev | def.com |
| ghi-com.deploy.dev | ghi.com |

DNS-RECORDS

| | |
|---|---|
| abc-com.deploy.dev | IP1, IP2 |
| def-com.deploy.dev | IP3, IP4 |
| ghi-com.deploy.dev | IP5, IP6 |

*Fig. 8*

PULL-BASED ON-DEMAND APPLICATION DEPLOYMENT TO EDGE NODE

CROSS-REFERENCE TO RELATED APPLICATION

This patent application claims the benefit of U.S. Provisional Patent Application No. 63/336,797, filed Apr. 29, 2022, which is incorporated by reference herein in its entirety.

BACKGROUND

Cloud computing providers typically have large, 'hyperscale' data centers with many computers providing a multi-tenant compute platform with resource isolation, so that tenants sharing the platform do not interfere too greatly with each other. Hardware and virtual machine (VM) scaling solutions allow workloads to adjust resource usage as needed to accommodate changes in demand. A cloud compute service ordinarily provides computer services to users on demand via the Internet from a cloud computing provider's servers. A cloud computing service generally provides access to provision and manage applications, resources and services, using an interface defined by the cloud services provider. Often, different cloud computing service providers provide different provisioning and management interfaces to applications. In many cloud computing services, a cloud service can be configured to dynamically scale certain applications based on performance or traffic measures. Typical characteristics of cloud services include self-provisioning and elasticity. That is, customers can provision services on their own via a cloud provider interface, such as a web graphical user interface (GUI) or application programmatic interface (API), on an on-demand basis and shut them down when no longer necessary. Examples of cloud services include online data storage and backup solutions, Web-based e-mail services, hosted office suites and document collaboration services, database processing and managed technical support services.

Often, cloud services are user self-provisioning. A cloud compute provider ordinarily relies upon users/customers to provide software and data placement instructions, generally to identify the cloud machine details and data center location to which an application service is to be provisioned. In some public clouds, user self-provisioning can take place over the Internet. In some enterprises, an IT organization will establish a portal application that business unit leaders and end users can utilize to request the resources necessary to run a new application. Some cloud providers, particularly those that cater to smaller businesses, provide self-provisioning portals to customers.

A public cloud service typically is one based on a cloud computing model in which a service provider makes resources, such as VMs, applications or storage, available to the general public over the Internet. Public cloud service providers usually provide a multi-tenant architecture that enables users—or tenants—to share computing resources, although each tenant's data in the public cloud ordinarily remains isolated from other tenants. A public cloud generally relies on high-bandwidth network connectivity to rapidly transmit data.

A content delivery network (CDN) provides edge delivery of static content to end users by caching that content on CDN edge server locations following a first request for that content and serving it from a local cache upon subsequent requests, saving the time to re-fetch that content from a possibly distant 'origin' server. Content includes information such as music, videos and podcasts, for example. A CDN also can accelerate requests for un-cached content by finding optimized routes across the Internet back to the application that holds or generates that content. Un-cached content includes dynamically generated content or content that has not been fetched previously to that CDN location. A CDN system measures traffic demand for content and directs end users to CDN edge servers to prevent resource exhaustion while meeting network latency and other objectives. A CDN edge server delivers content in response to a user request.

U.S. Pat. No. 10,791,168, entitled, Traffic Aware Network Workload Management System, discloses a network workload management system that includes a placement orchestration manager that pushes applications over the internet to nodes at the internet edge that are located geographically closer to user devices that use the application. The edge nodes can be located at geographically distributed locations such as in different states, in different locations within different states, and in different locations within a city. The disclosed orchestration manager can adjust the placements of an application to run in more, fewer, or different edge nodes as application demand changes over time. The disclosed orchestration manager selects edge nodes at which to place applications based upon factors including variations in demand at different edge nodes and variations in edge node resource availability. The orchestration manager can track resource usage of edge nodes, adjust edge resource allocation as needed to meet current and expected traffic needs, determine where applications should be placed, and which placed applications should receive application traffic.

Nevertheless, there is a need for on-demand application deployment to an edge node in response to a client request received at the edge node. The ability of a client to pull an application on demand to an edge node nearby to the client can reduce latency by reducing the distance between the client and the application. Latency can be an important factor in the effectiveness of certain applications such as mobile map applications, AI control of mobile systems, and mobile gaming, to name a few.

BRIEF DESCRIPTION OF DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

FIG. 5A is an illustrative drawing representing an example base station and an example co-located edge node that includes trigger-related logic shown receiving a DNS request from a client for access to a server application.

FIG. 5B is an illustrative drawing following DNS resolution in the event that the requested server application is currently deployed to the edge node at the time of a request from the client for access to the server application.

FIG. 7A is an example CNAME-record owned by an application provider abc.com.

FIG. 7B is an example DNS record owned by the deployment controller.

FIG. 8 is an illustrative drawing showing multiple example CNAME-records owned by respective application providers and multiple corresponding example DNS records for respective alias domains owned by the deployment controller.

DETAILED DESCRIPTION

Figure 1:
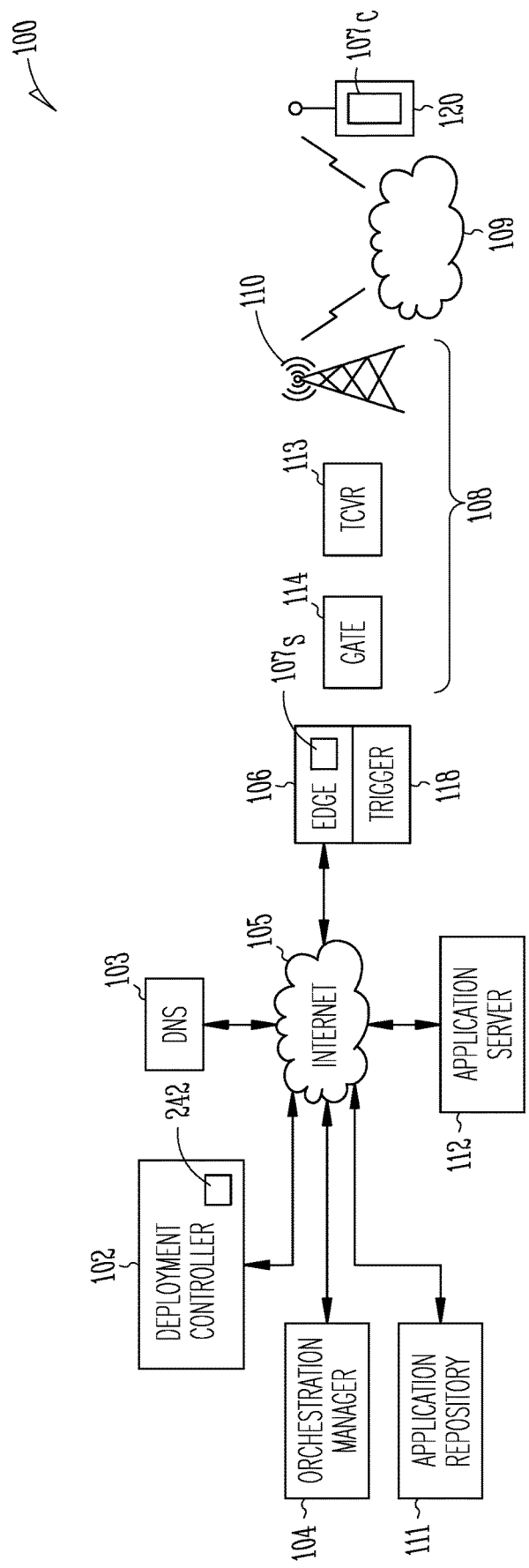
FIG. 1 is an illustrative drawing showing an example application management system.

FIG. 1 is an illustrative drawing showing an example application management system 100. The application management system 100 includes an example application deployment controller 102, a DNS service 103, an orchestration manager 104, an application repository 111, and an application server, 112, that communicate over a network 105 with an example edge node 106 that is geographically co-located and coupled to communicate with a base station 108. An example network 105 includes the Internet. As used herein a "node" refers to one or more processors of a physical (bare metal) machine or a virtual machine (VM) and may be implemented in one or more special-purpose (e.g., specialized) computing machines, in whole or in part, as described below with respect to FIG. 14. As used herein the term "edge node" refers to a node that is an entry point to the network 105 and that can host one or more applications. The edge node 106 and the base station 108 may be "co-located" sharing the same chassis, the same server rack, the same building, or the same facility.

A hosted application includes a server application component $107_S$ and a client application component $107_C$. The server application component $107_S$ provides functions in response to requests from the client application component $107_C$. The example edge node 106 hosts a server application component $107_S$, which the deployment manager 102 can to run on one or more nodes within the network 105. A server application component $107_S$ and a corresponding client application component $107_C$ can be provisioned to run on different computing machines and to communicate over the network 105. For example, a server application component $107_S$ can be provisioned to run on a node within the Internet and a client application component $107_C$ can run at an endpoint user device that communicates over the Internet with the server application component $107_S$. Alternatively, a server application component $107_S$ and the client application component $107_C$ can be provisioned to run within a single computing machine. A downloadable application, sometimes referred to as an "App," may act as a client application component $107_C$ used to access functions provided by a server application component $107_S$. A Browser may act as a user interface to a client application component $107_C$. Applications also may be referred to as "workloads".

A typical process to access an application includes sending a DNS request by a client $107_C$ to locate a network address of the server application $107_S$ on the network 105. Once the client $107_C$ learns the network address of the server application $107_S$, the client $107_C$ initiates set up of a TCP/IP connection between the client application $107_C$ and the server application $107_S$. The client application $107_C$ can send HyperText Transfer Protocol (HTTP) requests over the TCP/IP connection to interact with the server application $107_S$ to access information and functions provided by the server application $107_S$, for example.

The base station 108 includes an antenna and/or microwave dish 110 and corresponding RF radio transmitter and receiver electronics 113 that are used to handle cellular radio traffic. The base station 108 includes a carrier gateway 114 that acts as an interface between the Internet and the mobile wireless carrier network 109. More particularly, the carrier gateway 114 allows communications traffic flow between the base station 108, which acts as an entry point to the mobile wireless carrier network 109, and the edge node 106, which acts as a local entry point to the Internet 105.

Trigger control logic 118 operative at the example edge node 106 communicates over the network 105. Together, the trigger control logic 118 and the deployment controller 102 control deployment of a server application $107_S$ over the network 105 in response to a request from a client application $107_C$. running on an endpoint device 120 to access the server application component $107_S$. For economy of discussion, the client application component $107_C$ shall be referred to as a "client", and the server application component $107_S$ shall be referred to as the "application" or as the "hosted application". The trigger control logic 118 causes sending of a trigger message to the deployment controller 102, which manages deployment of the requested application to the edge node 106 co-located with a base station 108 that receives the request from the client $107_C$. An example endpoint device 120 can include tablet computer, a smart phone, a vehicle computer, a navigational device, a portable media device, a smart phone, a desktop computer, a portable media device, or a wearable device (e.g., a smart watch, smart glasses, smart clothing, or smart jewelry), for example.

The trigger message identifies a requested application and a network address (e.g., an IP address) of the edge node 106 at an entry point to the network 105 where the client request is received. In response to the trigger message that identifies the application 107$_S$ and an edge device 106, to which the requested server application 107$_S$ has not been deployed, the deployment controller 102 causes the orchestration manager 104 to provision the identified edge node 106 to run the application and to deploy the application to the provisioned edge node 106. Also, in response to the trigger message, the deployment controller 102 causes the DNS service 103 to add information that associates an identifier of the requested application with the network address of the identified edge node 106, so that further requests for the server application received at that edge node 106 can be served from an instance of the application deployed to that edge node 106. In response to a trigger message that requests access to a server application 107$_S$ that already has been deployed to the identified edge node 106, then no action is required of the deployment controller 102.

Once the server application 107$_S$ is deployed to the edge node 106, a client 107$_C$ running on an endpoint device 120 that later connects over the wireless carrier network 109 with the base station 108 to request access to the application 107$_S$ will be directed by the DNS service 103 to access the instance of the application 107$_S$ running on the edge device 106 that is co-located with the base station 108. A client 107$_C$ running on an endpoint device 120 thereby can experience reduced communication latency by accessing the instance of the application 107$_S$ deployed at the edge node 106 instead of having to access the application from some different geographically more distant application node (not shown) on the network 105, for example.

Figure 2:
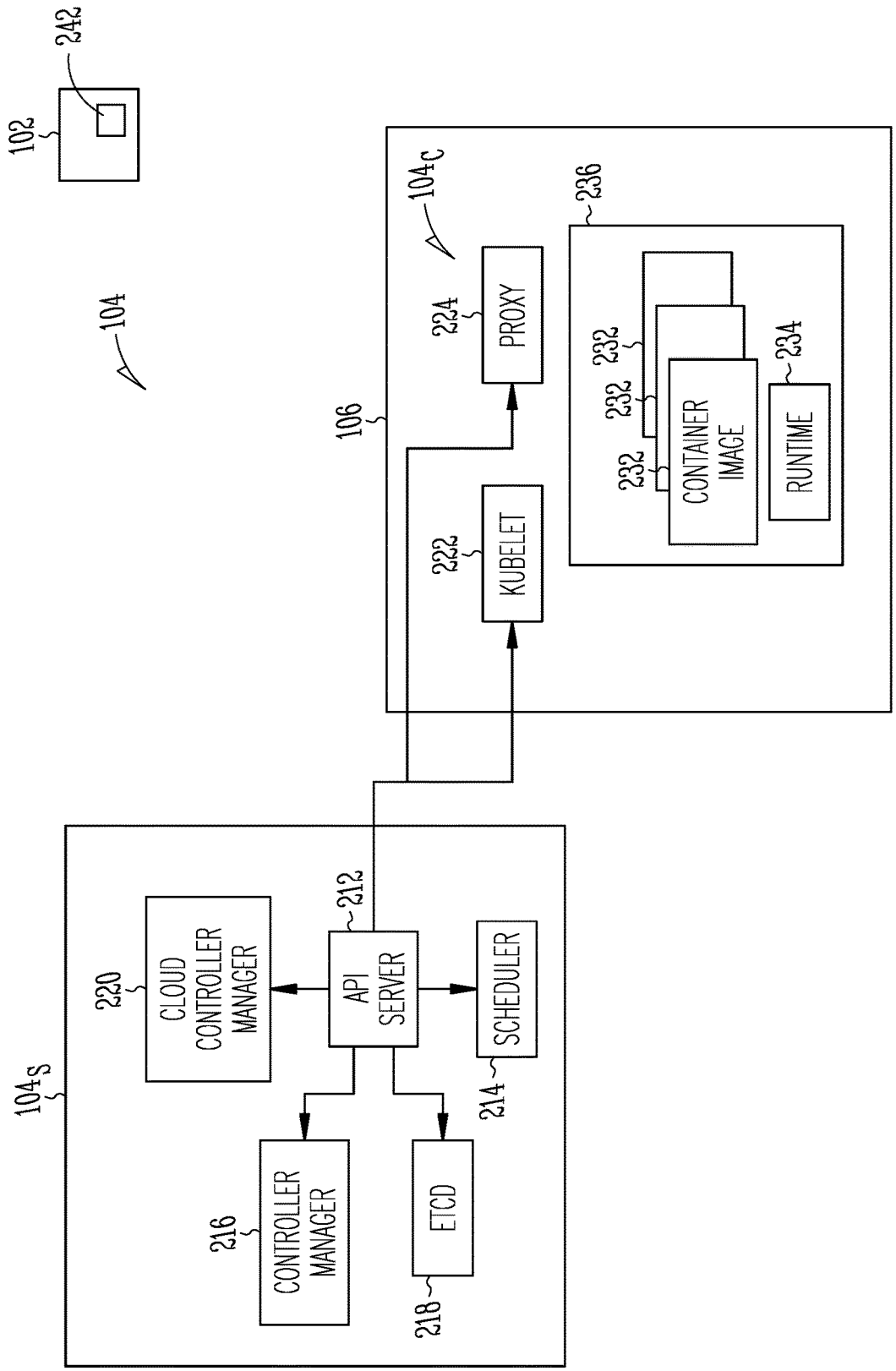
FIG. 2 is an illustrative drawing showing certain details of the orchestration manager and showing certain details of provisioning of an edge node.

FIG. 2 is an illustrative drawing showing certain details of the orchestration manager 104 provisioning of the edge node 106 to host the server application 107$_S$. The deployment manager 102 causes the orchestration manager 104 to provision the edge node 106 to run an identified server application 107$_S$. The deployment manager 102 controls deployment by providing a manifest 242 that describes requirements to run the requested server application 107$_S$. The embodiment of FIG. 2 shows an implementation of the orchestration manager 104 that uses the Kubernetes server-client provisioning architecture to provision containerized applications. A Kubernetes cluster comprises a collection of nodes on which workloads can run. A Kubernetes cluster consists of nodes and a control plane. The control plane architecture is composed of an API server, a scheduler, a controller, and a key-value store called etcd, described below. Nodes running in the cluster are typically worker nodes, which run pods. Several other components are involved in the process, including container runtimes, kubelet, and kube-proxy, described below.

The example application 107$_S$ is "containerized". A container is a virtualized run-time environment for a containerized application. An example orchestration manager 104 provisions software infrastructure in which to execute containerized applications. An example container 236 comprises a private network and a virtual file system that runs on a host node and that is not shared with other containers or the host node. An example container 230 includes a container image 232 and a container runtime 234. In this example, the server application 107$_S$ is implemented as the container 230.

An example container image 232 includes application code, libraries, tools, dependencies, and other files used to enable an application to run. An example container runtime 234 comprises computer program code to run the application code defined in the container image 232. A container runtime is the container-execution framework that can run containers. An example container runtime 234 is responsible for activities such as loading a container image from the application repository 111, monitoring local system resources, isolating system resources for use of a container, and managing container lifecycle. In short, a container runtime 234 is used to execute the container image 232. Examples of container runtimes include runC, containerd, OCI, Docker, and Windows Containers. The example server-client provisioning architecture manages the container 236 as it runs on the operating system of the host edge node 106 within a pod 236. A pod is a mechanism Kubernetes uses to group containers. A pod can have one or more containers. An example pod's contents are co-located and co-scheduled and run in a shared context. An application may include more than one pod. Kubernetes manages a pod as a single unit. For example, Kubernetes can start and stop a pod, which implies all containers in the pod are also started/stopped as a group.

The orchestration manager 104 includes an example master server provisioning component 104$_S$ that runs on a node 204 in the network 105 and an example client provisioning component 104$_C$ that runs on the example edge node 106. Alternatively, both the master server provisioning component 104$_S$ and the client provisioning component 104$_C$ can run on the same edge node 106. Components of the example server-client provisioning architecture are known and will be described only briefly herein. The master server provisioning component 104$_S$ includes an API server 212, which is a component of the Kubernetes control plane that exposes a Kubernetes API. The API server 212 accepts requests, determines whether they are valid and executes them. A kube-scheduler 214 identifies new pods to be deployed, determines what nodes to deploy them to, and assigns node resources to pods. The example master server provisioning component 104$_S$ includes a controller manager 216, which runs controller processes including configuration changes, such as replacing the container image from which the pods are running or changing container parameters. The example master server provisioning component 104$_S$ includes an etcd repository 218, which comprises a distributed key value storage for consistent and highly available key value store used for all node cluster data. The example master server provisioning component 104$_S$ includes a cloud controller manager 220, which is responsible for managing controller processes with dependencies on an underlying cloud provider (if applicable). The example client provisioning component 104$_C$ includes a kubelet-manager 222, which is an agent that runs on each node in a cluster of nodes to ensure that containers are healthy running in a desired state. The client provisioning component 104$_C$ includes a kube-proxy 224, which is a network proxy service that runs on each node to handle individual host subnetting and to expose services to the external world.

During deployment of the containerized application, the edge node 106 sends its capabilities for example number of CPUs/Memory/Available-Storage-size/GPU/Hardware-Spec. Upon receiving the above request, the deployment controller 102 evaluates the policy associated with the application to find the eligibility of the edge cluster to deploy the application. If the edge node is eligible to run the application, then the deployment controller 102 causes the orchestration manager 104 to deploy one or more container images 232 to run on the runtime 234 on the edge node 106. More particularly, the deployment controller 102 downloads a manifest 242 to the orchestration manager 104 that includes parameters for the container images 232. In the example Kubernetes server-client provisioning architecture, the controller manager 216 uses the manifest 242 to configure container parameters within the example pod 236 on the identified edge node 106 to enable running the server application $107_S$. The manifest file 242 includes the details of the application's container image (binary), configuration details, cpu/memory/storage requirements, for example, Kubernetes style YAML spec or Helm-chart etc. The client provisioning component $104_C$ at edge node 106 inspects the manifest, performs customization of application configuration based on its environment properties. The customization at the edge is also called an override. After the above step, the client provisioning component $104_C$ at edge node 106 installs/deploys the application from the application repository 111 to the local cluster nodes. When the above step is successful, the client provisioning component $104_C$ at edge node 106 performs a health check as per the manifest to make sure the application is healthy. When the above steps are completed, the deployment controller 102 updates the DNS records to accept traffic.

It will be appreciated that although reference is made to deployment of an application to a node and to a pod, the application can be deployed to multiple pods and can be deployed to multiple edge nodes within a cluster.

Figure 3:
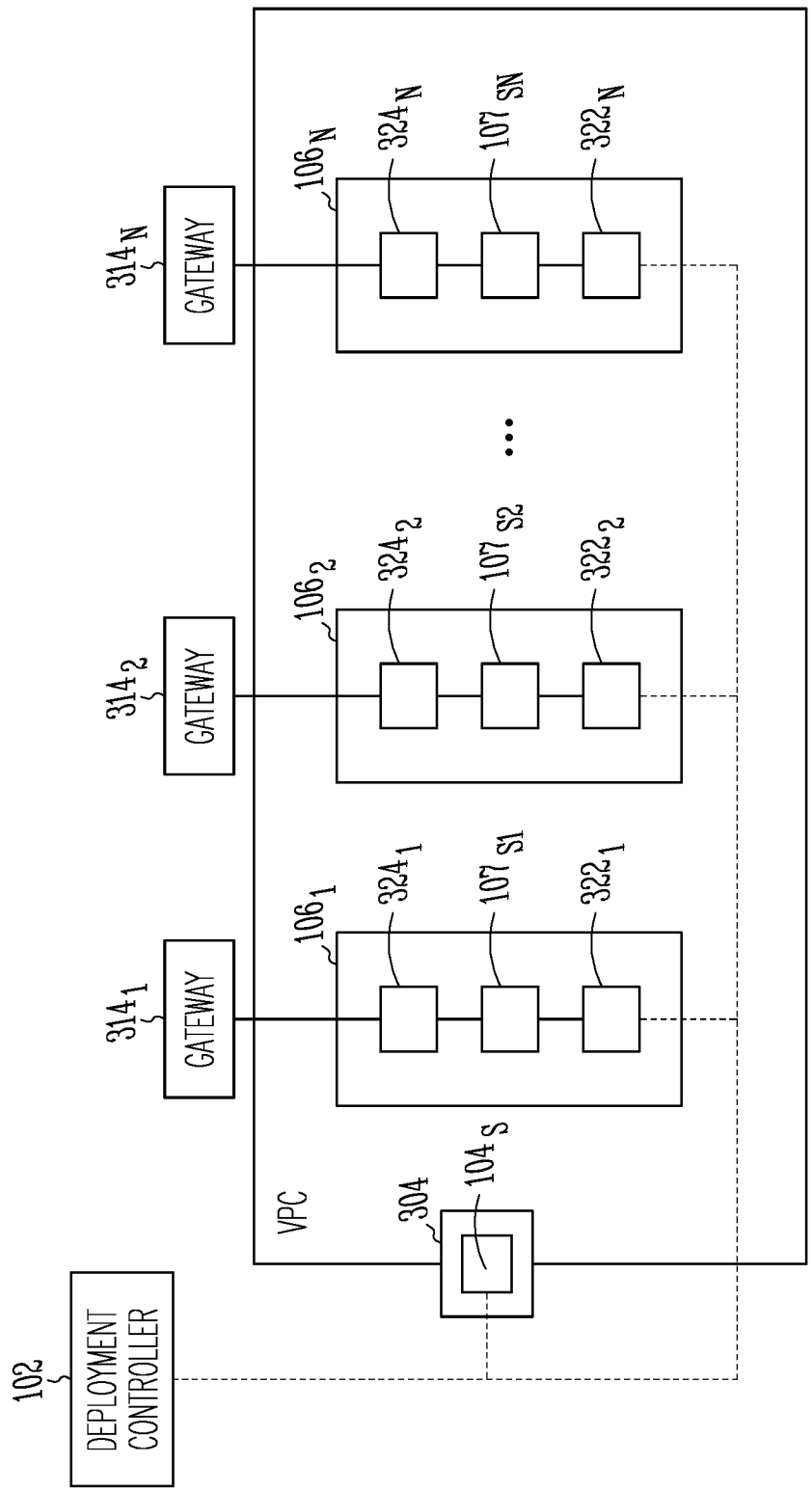
FIG. 3 is an illustrative drawing representing a deployment controller configured to control application deployment to edge nodes provisioned by a server-client orchestration manager.

FIG. 3 is an illustrative drawing representing a deployment controller 102 configured to control application deployment to a cluster of edge nodes $106_1$-$106_n$ provisioned by a server-client orchestration manager $104_S$, $104_C$. A master server provisioning component $104_S$ is provisioned at a node 304 within a virtual private cloud (VPC) 302 created within the network 105, and each of the multiple edge nodes $106_1$-$106_n$ includes a respective client provisioning component $104_C$ that is contained within the VPC 302. More particularly, each edge node $106_1$-$106_n$ is provisioned with a corresponding kubelet-manager $322_1$-$322_n$ and with a corresponding kube-proxy $324_1$-$324_n$. Each edge node $106_1$-$106_n$ can run one or more containerized server application components $107_{S1}$-$107_{Sn}$. The deployment manager 102 can communicate with the server-client orchestration manager $104_S$ and with each of the kubelet-managers $322_1$-$322_n$ to cause deployment of manifests to configure containers at the edge nodes $106_1$-$106_n$. The example edge nodes $106_1$-$106_n$ are co-located with corresponding base stations (not shown). Each kube-proxy $324_1$-$324_n$ is coupled to a different base station (not shown) via a corresponding carrier gateway $314_1$-$314_n$. The master server provisioning component $104_S$ can be provisioned to run on any one or more of the edge nodes $106_1$-$106_n$.

Figure 4:
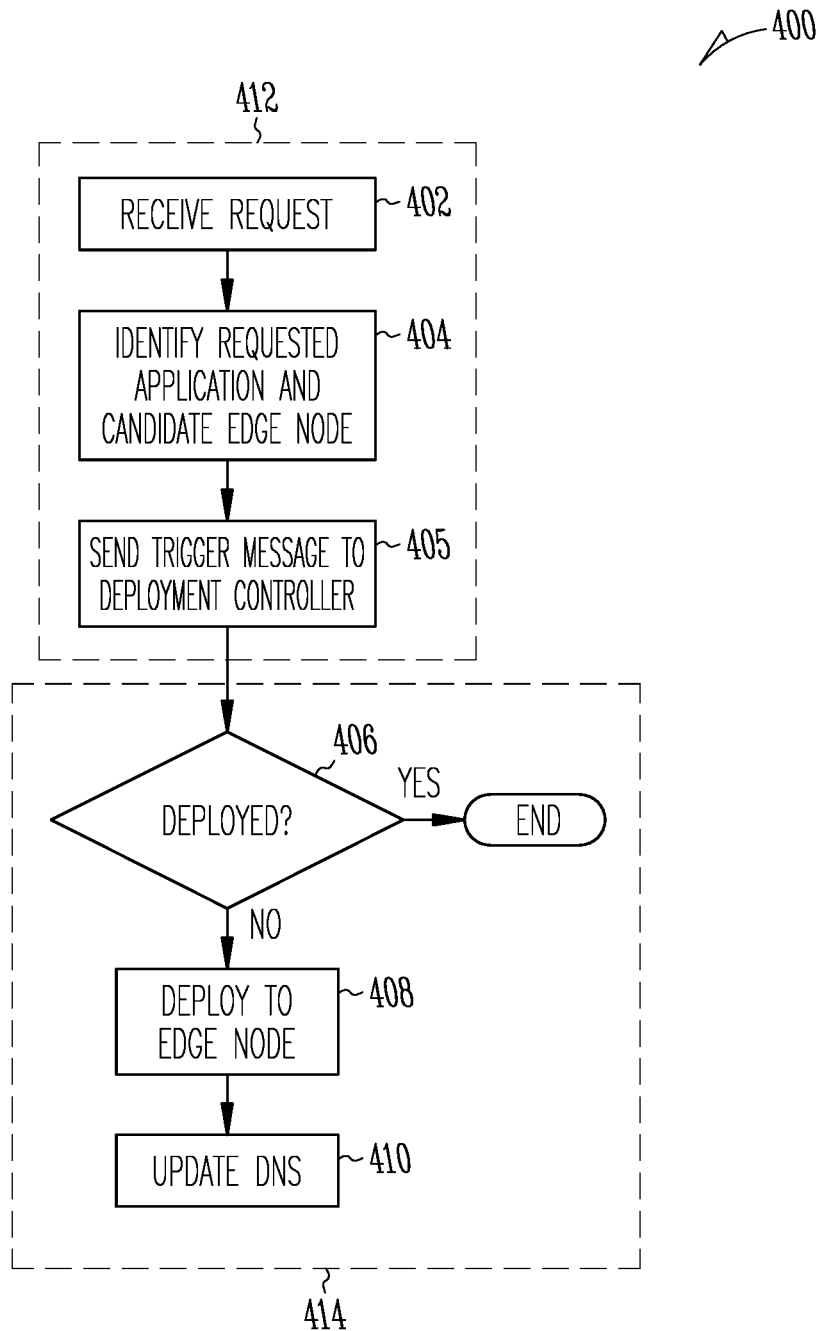
FIG. 4 is an illustrative flow diagram representing an example trigger and deployment process.

FIG. 4 is an illustrative flow diagram representing an example trigger and deployment process 400 in accordance with some embodiments. The process 400 is implemented using one or more computing machines programmed with executable instructions to perform the following operations. Referring to FIG. 1, a client $107_C$ running on an endpoint device 120 transmits a wireless message requesting access to a server application $107_S$. Operation 402 receives the message that requests access to the server application $107_S$ over the network 105. Operation 404 identifies the requested server application and a network address of a candidate edge server to which to deploy the identified server application. Operation 405 sends a trigger message over the network 105 to the deployment controller 102 that identifies the requested server application $107_C$ and identifies a network address of the edge node. Operation 406 determines of whether the identified server application currently is deployed at the edge node 106. Operation 408 causes deployment of a requested candidate application that has not yet been deployed, to the identified edge node. Operation 410 updates domain name server (DNS) information at the DNS service 103 to indicate the requested application's deployment to the edge node 106. As explained below an example trigger-related operations 412 of the process 400 that includes example operations 402, 404, 405 can occur at a base station 108, or at an edge node 106 co-located with the base station 108, or at an application server 112 in a cloud location, for example. An example deployment related operations 414 of the process 400 that includes example operations 406, 408, 410 can occur at a deployment controller 102, an orchestration manager 104, and DNS service 103, respectively.

FIG. 5A is an illustrative drawing representing an example base station 108 and an example co-located edge node 106 that includes trigger-related logic 412 shown receiving a DNS request from a client $107_C$ for access to a server application $107_S$. The base station 108 and the co-located edge node 106 are implemented using one or more computing machines. The base station 108 includes a gateway 114 and a DNS server 510. The edge node 106 includes one or more computing machines configured with program instructions to perform operations of the example trigger-related operations 412 of the process 400 of FIG. 4. An example DNS server 510 that runs at the station 108 operates as a recursive DNS server used to determine available IP network addresses for requested server applications. A recursive DNS server may make a series of requests over the network 105, in request from a client $107_C$, to identify an authoritative DNS service 103 that holds a DNS record that contains one or more IP addresses where a requested server application can be accessed.

Still referring to FIG. 5A, in operation, a client $107_C$ with a network address, IP1, creates a wireless connection over the wireless carrier network 109 with the base station 108. When the client $107_C$ joins the carrier network 109, the base station 108 sends to the client $107_C$ the network address, IP2, of the DNS server 510, which the client uses to send a DNS request for the IP address of the sought-after server application $107_S$. The DNS request identifies the requested server application. The example co-located edge node 106 has a network address, IP3. DNS server 510 sends messages via a gateway 114, which has a network address, IP4, over the network 105 to identify a network IP address of the requested server application $107_S$. In an alternative embodiment (not shown), the gateway 114 can be embedded within an edge node 106. For example, the gateway 114 can be implemented as a Kubernetes ingress controller. During a DNS lookup, DNS resolution traffic (e.g., UDP protocol with destination port 53) is transmitted between the client $107_C$ on the wireless carrier network 109 and one or more DNS servers 103 (e.g., a root server, a TLD nameserver, and an authoritative server) (not shown). The operation of recursive DNS servers is well known to persons of ordinary skill and will not be described further. An example DNS server 510 at IP2 sends a control trigger message 512 to the edge node 106 at IP3 that includes a copy of the DNS request and IP1 as payload. The application identifying information in the DNS request is used by the trigger-related operations 412 of the process 400 described above with reference to FIG. 4 and in the more detail below with reference to FIG. 6A. Alternately, if the trigger logic operations 412 can be implemented in an alternate functional block (not shown) of the base station 108 that knows the network address, IP3, of the edge node 106 and that can communicate the application identifying information and address of the edge node 106 over the network 105 to the deployment controller 102. The deployment controller 102 is implemented using one or more second computing machines. FIG. 5B is an illustrative drawing following DNS resolution in the event that the requested server application $112_S$ is currently deployed to the edge node 106 at the time of a request from the client $107_C$ for access to the server application $107_S$. The client 107C at IP1 requests a TCP/IP connection with the edge node 106 at IP3. Whereupon the client $107_C$ can send HTTP requests to an instance of the server application $107_S$ operative at the edge node 106 at IP3.

Figure 5C:
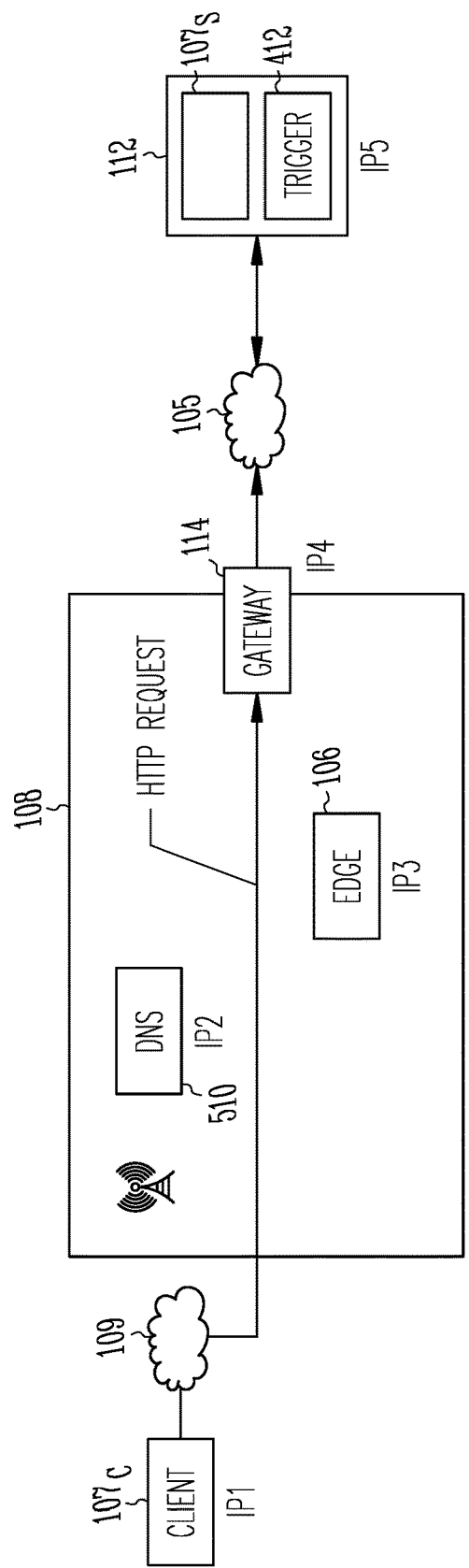
FIG. 5C is an illustrative drawing representing communication traffic flow following DNS resolution in the event that the requested server application is not currently deployed to the edge node at the time of a request from the client for access to the server application.

FIG. 5C is an illustrative drawing representing communication traffic flow following DNS resolution in the event that the requested server application $107_S$ is not currently deployed to the edge node 106 at the time of a request from the client $107_C$ for access to the server application $107_S$. Moreover, in the example embodiment of FIG. 5C, the trigger-related logic operations 412 are not operative at the base station 108. Communication traffic flows between the client $107_C$ at IP1 and the base station gateway 114 IP4 and the application server 112, at network address IP5, that serves the requested server application $107_S$. The client $107_C$ at IP1 requests a TCP/IP connection with the instance application operative at application server 112 at IP5. Whereupon the client $107_C$ can send HTTP requests to the instance of the server application $107_S$ operative at the application server 112 at IP5.

As explained below with reference to FIGS. 11A-11B, the application server 112 can include one or more computing machines configured with program instructions to perform the example trigger-related logic operations 412 of the process 400 of FIG. 4. The application server 112 can be configured with program instructions to use the IP4 address of the gateway 114 to determine the latitude and longitude of a co-located edge node 106. More particularly, a look-up database (not shown) accessible to the server application 112 is used with determine a lat-long of the IP4 network address of the gateway 114, which is the source of the HTTP request vis-à-vis the application server 112, and to determine a lat-long of the IP3 network address of the edge node 106 located geographically closest to the gateway 114. The trigger-related logic operations 412 that operates at the application server 112 send the IP3 address of the identified edge node 106 together with a name of the identified server application $107_S$ over the network 105 to the deployment controller 102.

Figure 6A:
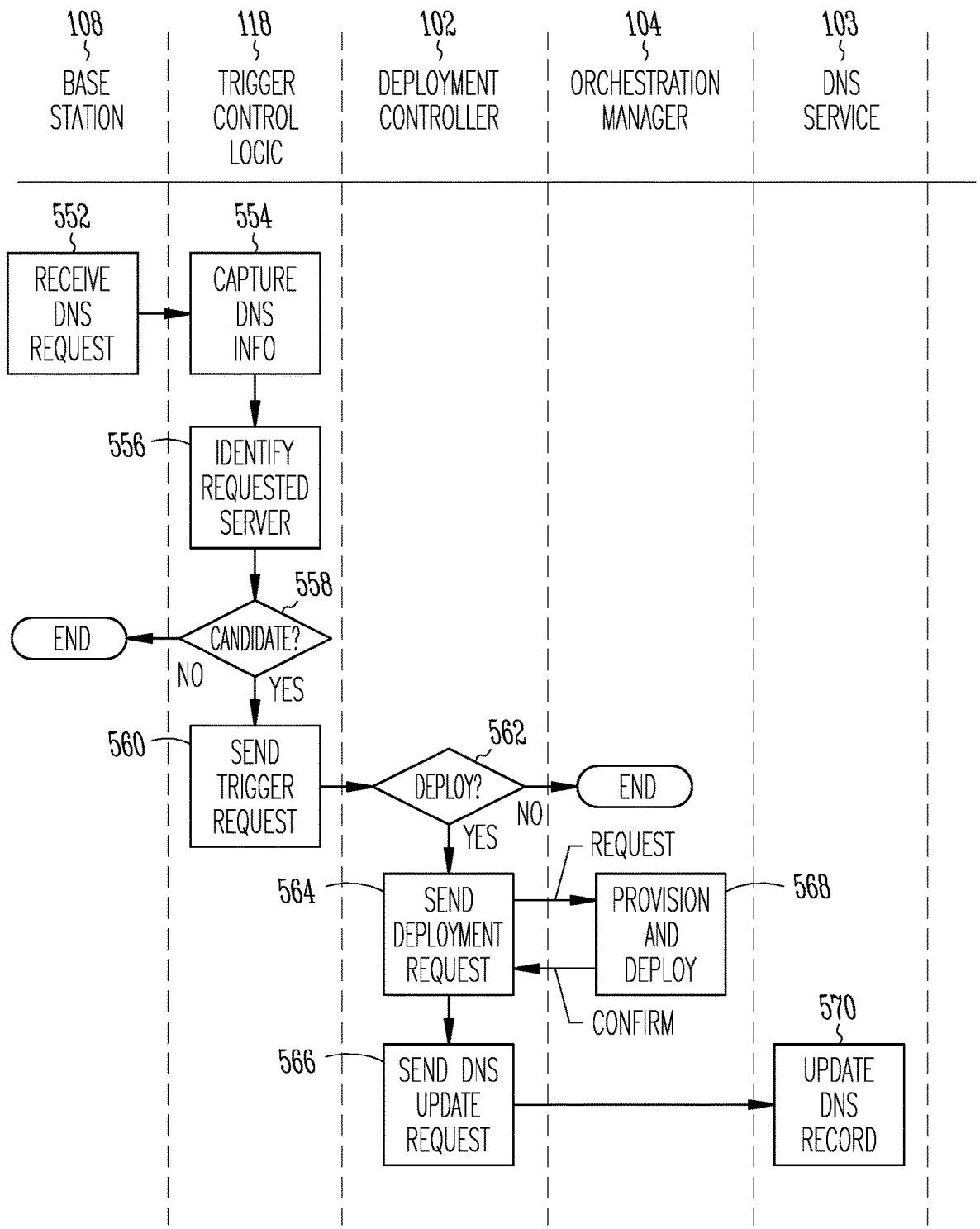
FIG. 6A is an illustrative sequence diagram that represents certain additional details of an example application trigger and deployment process 550.
Figure 6B:
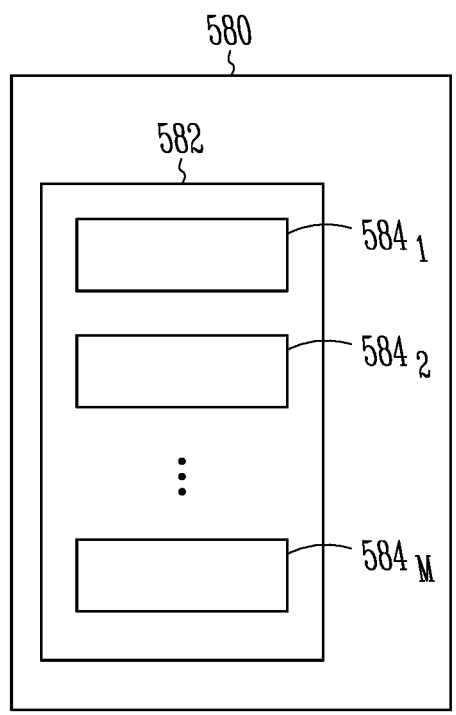
FIG. 6B is an illustrative drawing that represents example candidate server application names in a stored file.

FIG. 6A is an illustrative sequence diagram that represents certain additional details of an example application trigger and deployment process 550. The application deployment process 550 involves operations performed using the DNS service 103 and the orchestration manager 104 under control of the trigger logic 118 and the deployment controller 102. In the following description, example operations 552-60 are trigger-related operations and example operations 562-570 are deployment-related operations. At operation 552, the base station 108 receives a DNS request from a client $107_C$. Operation 554 at the trigger control logic 118, captures a copy of the DNS request information from the DNS traffic. Operation 556 at the trigger control logic 118, identifies the requested name of the server application from the captured DNS request information. Operation 558 at the trigger control logic 118, determines whether the identified server application name identifies an application to be deployed to the edge node 106. More particularly, as shown in FIG. 6B, a computer readable storage 580 stores a host application name 582 file that identifies names of applications 5841-584m to be deployed upon request. Operation 558 at the trigger control logic 118, checks the host application name file 582 to determine whether the identified application name is contained therein. The identified application is determined to be a candidate for deployment based upon its name being identified in the host application name 582 file. An example host application name 582 file can identify application hostnames abc.com, def.com, and ghi.com. If operation 558 determines that the identified name is not identified in the host name application file 582, the process 550 ends. If operation 558 determines that the identified name is included in the file 582, then at operation 560 at the trigger control logic 118, sends a trigger message over the network 105 to the deployment controller 102. The trigger message identifies the candidate server name and a network address (e.g., an IP address) of the edge node 106.

The trigger control logic 118 can be implemented at the edge node 106, at the base station 108, or at separate node (not shown) Thus, the edge node 106 can include one or more computing machines programmed with executable instructions to perform operations 554, 556, 558, 560. Alternatively, the base station 108 can include one or more computing machines programmed with executable instructions to one or more of perform operations 554, 556, 558, 560. As yet another alternative, separate node (not shown) can include one or more computing machines programmed with executable instructions to one or more of perform operations 554, 556, 558, 560 can run as an independent service outside the edge node.

Operation 562 at the deployment controller 102, determines whether the requested candidate application is currently deployed at the edge node 106. More particularly, operation 562 checks a DNS record corresponding the identified candidate application to determine whether the DNS record currently includes the network address of the identified edge node. Based upon a determination at operation 562, that the requested application currently is deployed to the edge node 106, no further action is required and the process 550 ends. Based upon a determination at operation 562 that the requested application is not currently deployed to the edge node 106, operation 564 at the deployment controller 102 sends a deployment message over the network 105 to the cause the orchestration manager 104 to deploy the requested application to the edge node 106. More particularly, in an example embodiment the requested application is a containerized application and at operation 564, the deployment controller 102 sends a manifest 242, which includes parameters for a container image for the identified application, to the master server provisioning component $104_S$ of the orchestration manager 104. Also, based upon a determination at operation 562 that the requested application is not currently deployed to the edge node 106, operation 566 at the deployment controller 102 causes update to a DNS record corresponding the identified candidate hostname to include the network address of the edge node 106. The deployment controller includes one or more computing machines programmed with executable instructions to perform operations 562, 564, 566.

In response to operation 564 and based upon the provided manifest 242, operation 568 at the master server provisioning component $104_S$ of the orchestration manager 104 causes provisioning for and deployment of the requested application to the edge node 106. Also at operation 564, once provisioning and deployment is completed, the orchestration manager 104 sends a message to the deployment controller 102 confirming successful deployment of the requested application.

Once deployment is completed, operation 566 at the deployment controller 102 sends a message to the DNS service 103 requesting updated of the corresponding DNS record. Operation 570 at the DNS service updates the corresponding DNS record in response to the request by the deployment controller 102. Once requested server application $107_S$ is deployed and a corresponding DNS record is updated, the server application $107_S$ can be served with less latency to a client $107_C$ located nearby to the edge node 106.

Operations 562 and 564 will be explained in more detail with reference to FIGS. 7A-7B and FIGS. 7-8. FIG. 7A is an example CNAME-record 602 owned by an example application provider abc.com. FIG. 7B is an example DNS record 604 owned by the deployment controller 102. A DNS record includes instructions that live on an authoritative DNS server and that provide information about a domain including what IP addresses are associated with that domain and how to handle requests for that domain. CNAME-records are domain name aliases. A "CNAME" is a canonical name for an alias. The example CNAME-record 602 identifies the CNAME abc-com.deploy.dev as an alias for the hostname abc.com. During a DNS lookup for the domain name abc.com, the CNAME-record 602 directs a DNS lookup for abc.com to the DNS record 604 for the alias domain name, abc-com.deploy.dev. The DNS record 604 identifies two example IP addresses, IP1, IP2, where the requested application having hostname, abc.com, is currently deployed and accessible. The DNS lookup returns at least one of IP1 and IP2 to a requesting client. In some DNS lookup implementations, when a requested application is deployed at multiple edge nodes, an IP address of an edge node located closest to a requesting client is determined based upon a lat-long lookup of the IP address of the requesting client, for example.

FIG. 8 is an illustrative drawing showing multiple example CNAME-records 602, 606, 610 owned by respective example application providers and multiple corresponding example DNS records for respective alias domains 604, 608, 612 owned by the deployment controller 102. The CNAME-records 602, 606, 610 and the DNS records 604, 608, 612 are stored in non-transitory computer readable memories (not shown). Example CNAME-record 602 owned by example application provider abc.com provides the alias abc-com.deploy.dev for the host domain name, abc.com. Example DNS record 604 owned by the example deployment controller 102 identifies IP addresses IP1, IP2 where the requested application having hostname, abc.com, is currently deployed and accessible. Example CNAME-record 606 owned by example application provider def.com provides the alias def-com.deploy.dev for the host domain name, def.com. Example DNS record 608 owned by the example deployment controller 102 identifies IP addresses IP3, IP4 where the requested application having hostname, def.com, is currently deployed and accessible. Example CNAME-record 610 owned by example application provider ghi.com provides the alias ghi-com.deploy.dev for the host domain name, ghi.com. Example DNS record 612 owned by the example deployment controller 102 identifies IP addresses IP5, IP6 where the requested application having hostname, ghi.com, is currently deployed and accessible.

Figure 9:
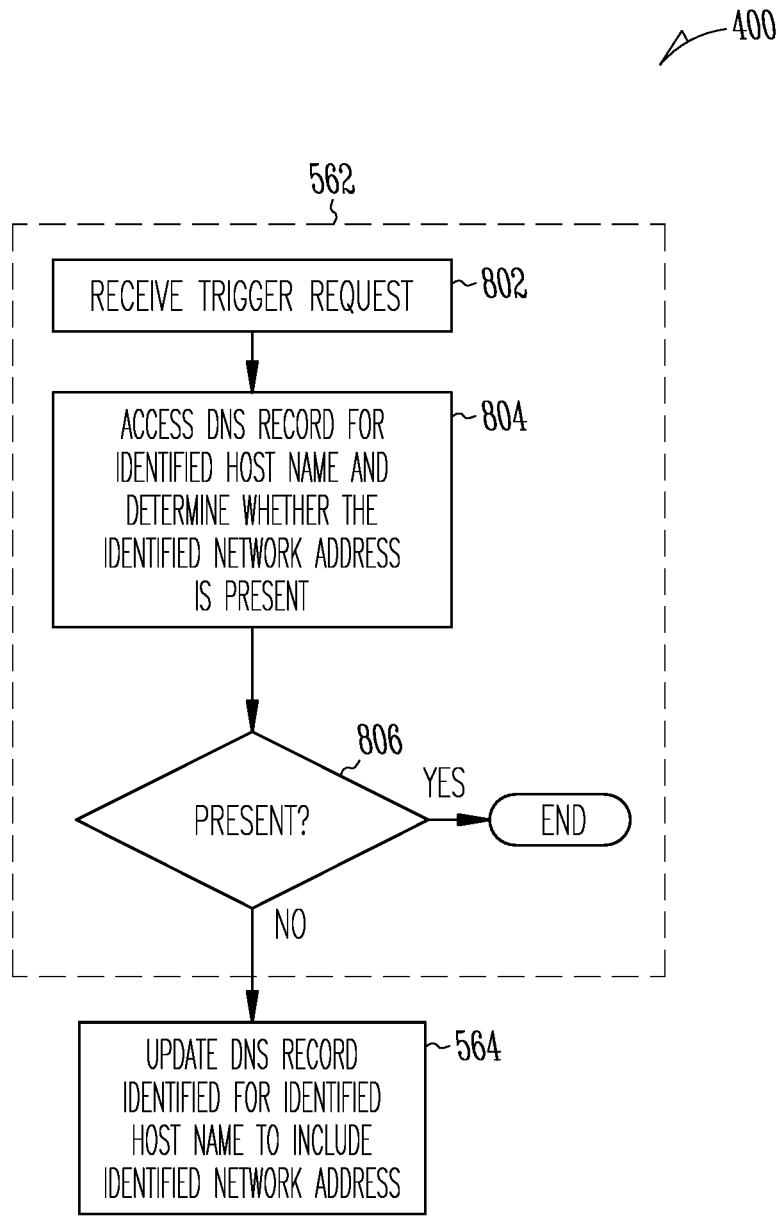
FIG. 9 is an illustrative flow diagram that shows additional details of the example deployment determination operation and the example DNS update operation of FIG. 6B.

FIG. 9 is an illustrative flow diagram that shows certain additional details of an example deployment determination operation 562 and DNS update operation 564 of FIG. 6A. Example deployment determination operation 562 includes example operations 802, 804, 806. Operation 802 receives the trigger request message that identifies a hostname of a requested application and that identifies a network address of an edge node 106. Operation 804 identifies a DNS record (e.g., one of records 604, 606, 608) of an alias domain corresponding to a domain identified by the hostname and determines whether the identified network address is included in the network address identified in the alias domain. Operation 806 ends the deployment operation in response to a determination that the identified network address is included in the DNS record of the alias domain corresponding to a domain identified by the hostname. Operation 806 causes control to flow to operation 564 in response to a determination that the identified network address is not included in the DNS record of the alias domain corresponding to a domain identified by the hostname. Operation 564 updates the DNS record of the alias domain corresponding to a domain identified by the hostname to include the identified network address identified in the received trigger request message.

For example, assume that the trigger request identifies a server application named, def.com, and identifies a network address, IP15. In response to the trigger request, operation 804 identifies DNS record 606 as corresponding to the identified hostname def.com and determines that the identified network address IP15 is not included in the DNS record 606. Accordingly, operation 564 adds network address IP15 to the list of network addresses set forth in the DNS record 606 at which the application with hostname def.com is deployed and can be accessed.

Referring again to FIG. 5A, the DNS lookup proceeds independent of the deployment process of FIG. 6A and FIG. 9. Continuing with the above example, assuming that the requested hostname is def.com, the CNAME-record 606 directs the DNS lookup to the DNS record 608, which contains IP addresses IP1, IP2. In accordance with some embodiments the DNS lookup will return the one of IP1 or IP2 that is located closest to requesting client 107C, based upon a lat-long lookup of the IP address of the requesting client. It is noted that since the network address of the edge node 106 had not yet been added to the DNS record 608 at the time of the DNS lookup, the network address of the edge node 106 is not returned.

However, continuing with the above example, assume that after deployment of the application with the server application named, def.com and the corresponding update of the record 608 to include IP15, a subsequent DNS request is received from a client $107_C$ at the base station 108. This time, in response to the subsequent request, the DNS lookup returns IP15 to the client device $107_C$. The client then can proceed to access the instance of application def.com deployed at edge node 106.

Figure 10:
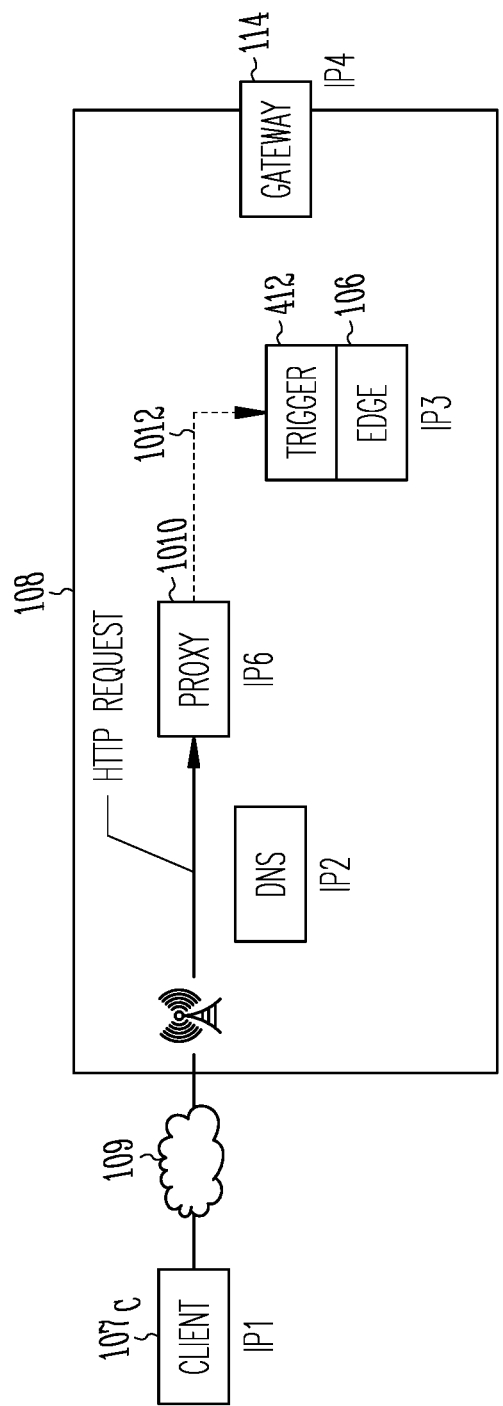
FIG. 10 is an illustrative drawing representing an HTTP request transmitted over the carrier network to request access to a hosted application.

Another alternative approach to deploying an application involves identifying the application by using an application proxy to capture a URL (Uniform Resource Locator) within a client request to access the application. FIG. 10 is an illustrative drawing representing an HTTP request transmitted over the carrier network 109 to request access to a server application $107_S$ after successful completion of a DNS process. The HTTP request includes an application name identifier (e.g., URL) that identifies the requested server application. A client $107_C$ transmits the HTTP request 902 over the carrier network 109 to the base station 108 co-located with an edge node 106. The edge node 106 includes an application proxy server 1010. In this alternative example embodiment, mobile carrier traffic communicated to the base station 108 is routed through the application proxy

1010. The client 107$_C$ still gets DNS resolutions. However, traffic that flows to the base station 108 through the carrier network 109 is redirected to the proxy server 904, which can inspect the traffic and filter URLs. An example proxy server 1010 at IP6 is transparent and client traffic that flows through it can access an application at a cloud location or at the edge node 106 depending on where the application is deployed.

The proxy server 1010 at IP6 sends a control trigger message 1012 to the edge node 106 at IP3 that includes has message content that includes a IP1 and the name of the requested application (e.g., URL) as payload. The application identifying information in the message 1012 is used by the trigger-related operations 412 of the process 400 described above with reference to FIG. 4 and in the more detail below with reference to FIG. 6A. Alternately if the trigger logic operations 412 can be implemented in an alternate functional block (not shown) of the base station 108 that knows the network address, IP3, of the edge node 106 and that can communicate the application identifying information and address of the edge node 106 over the network 105 to the deployment controller 102. Deployment related operations to determine whether to deploy the requested application to the edge node is substantially the same as that described with reference to FIG. 6A is except that operation 554 captures a URL from the HTTP request (instead of capturing DNS information), and operation 556 uses the captured URL to identify the requested server application (instead of using captured DNS information).

Figure 11A:
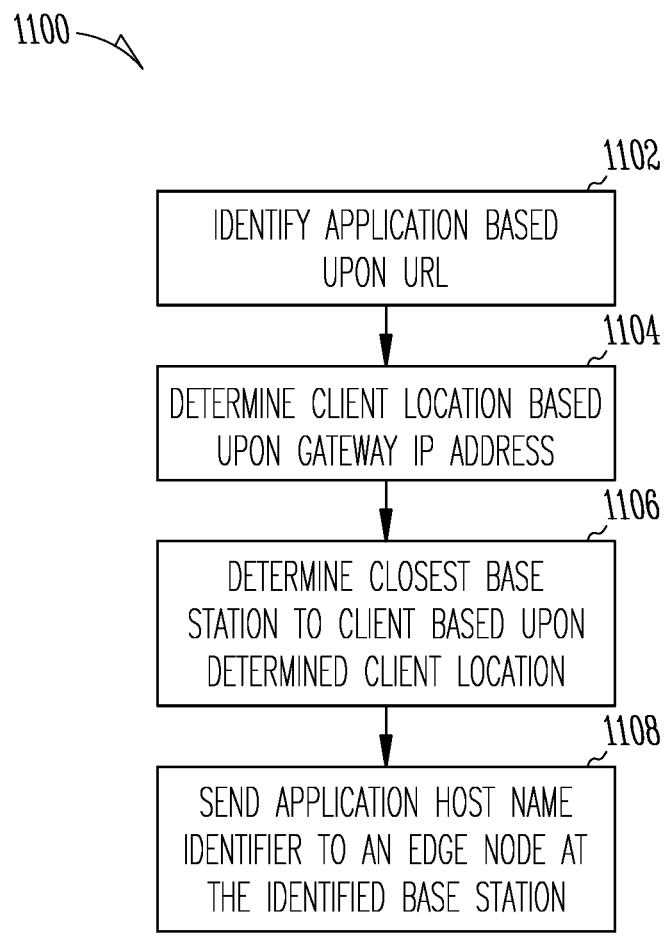
FIG. 11A is an illustrative drawing representing first trigger-related operations operative at an application server to identify a requested server application and an edge node on which to deploy an instance of the requested application based upon an HTTP request.

FIG. 11A is an illustrative drawing representing first trigger-related operations 1100 operative at an application server 112 to identify a requested server application and an edge node on which to deploy an instance of the requested application based upon an HTTP request. Referring again to FIG. 5C, there is shown an HTTP request issued from a client 107$_C$ via base station 108 to an application 107$_S$ operative on an application server 112 in the cloud. Operation 1102 identifies a requested application based upon application identifying information in the HTTP request 1002. Operation 1104 determines location of the client 107$_C$ based upon a lat-long lookup of the IP4 address of the gateway 114. Operation 1106 determines a geographically closest base station 108 to the determined gateway 114 location based upon predetermined mapping information (not shown) concerning locations of base stations. Operation 1108 sends the application hostname, which can be gleaned from the application name, which is readily available, over the internet 105 to the edge node 106 co-located with the base station identified in operation 1106. Thus, a future wireless request received over the carrier network 109 from a client in proximity to the edge node to which the application is deployed can be served with less latency. Deployment related operations used to determine whether to deploy the requested application to the identified edge node are substantially the same as the process 550 described with reference to FIG. 6A except that when using the first example process 1100, the process 550 is triggered by a message received, at a base station determined at operation 1106, from the application server, and that the server application name gleaned from an HTTP request is used for application identification instead of using a DNS request application identification. The application server computing machine 112 can be programmed with executable instructions to perform operations 1102-1108.

Figure 11B:
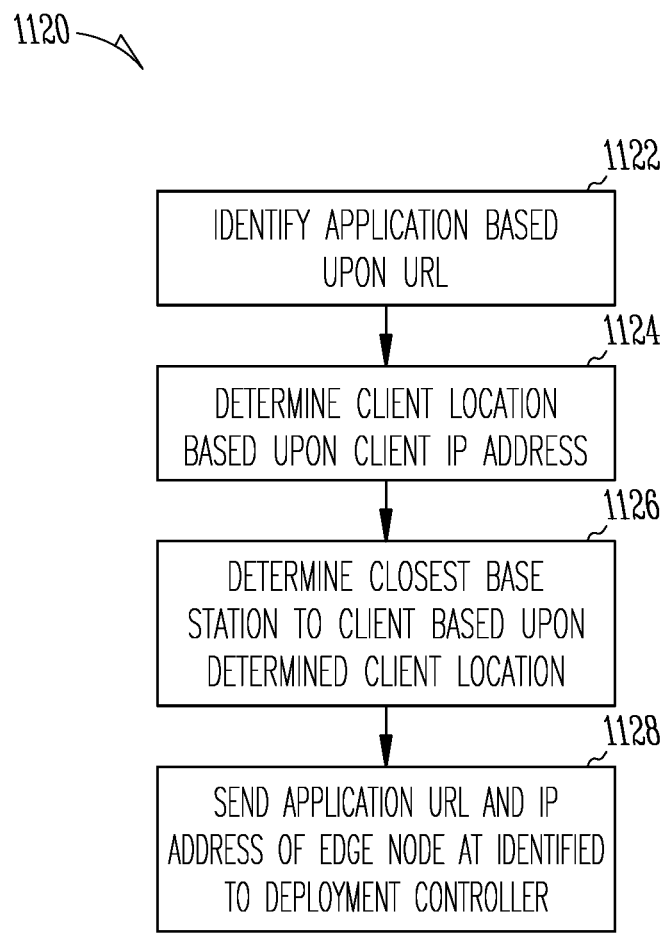
FIG. 11B is an illustrative drawing representing second example trigger-related operations operative at an application server to identify a requested server application and an edge node on which to deploy an instance of the application based upon an HTTP request.

FIG. 11B is an illustrative drawing representing second example trigger-related operations 1120 operative at an application server 112 to identify a requested server application and an edge node on which to deploy an instance of the application based upon an HTTP request. Referring again to FIG. 5C, there is shown an HTTP request issued from a client 107$_C$ via base station 108 to an application 107$_S$ operative on an application server 112 in the cloud. The second example process 1120 includes operation 1122, 1124, and 1126 that are substantially the same as 1102, 1104 and 1106 of the first example process 1100. Operation 1128 sends the network address, IP3, of the identified edge node 106 and the application name, gleaned from an HTTP request, over the network 105 to the deployment controller 102. Thus, a future wireless request received over the carrier network 109 from a client in proximity to the edge node to which the application is deployed can be served with less latency. Deployment related operations used to determine whether to deploy the requested application to the identified edge node is substantially the same as the process 550 described with reference to FIG. 6A except that when using the second example process 1120, a the server application 107$_S$ name gleaned from an HTTP request is used for application identification instead of using a DNS request application identification, and that when using the second example process 1120, control flows from the application server to operation 562 at the deployment controller 102. The application server computing machine 112 can be programmed with executable instructions to perform operations 1122-1128.

Nodes of clusters may be further segregated to different local last-mile regions. Referring again to FIG. 3, assume, for example, that an edge cluster comprising edge nodes 106$_1$-106$_n$ is located in a city such as Los Angeles, for example. Further, suppose that edge node 106$_1$ is designated as a master node. The edged nodes 106$_1$-106$_n$ of the cluster can be installed in every 2-mile radius for example in every cell tower location of a mobile network carrier. These nodes are connected to the master node 106$_1$ via gateways 314$_1$-314$_n$ in one location through fast network links (e.g., 5G). The master node runs the cluster control plane. The master node receives DNS requests from DNS service when a DNS server receives a query to resolve an application it sends a client location information and the application domain name to the master node of the cluster. The master node 106$_1$ detects the node that is closer to a client (not shown) who initiated the DNS query based on latitude long geo-proximity logics. An instance of the application is prepared from the manifest and deployed to the nearest nodes/nodegroup to the client. To prepare the application instance the application manifest is customized for example the name is modified to uniquely identify the application instance on a node/nodegroup etc.

Figure 12:
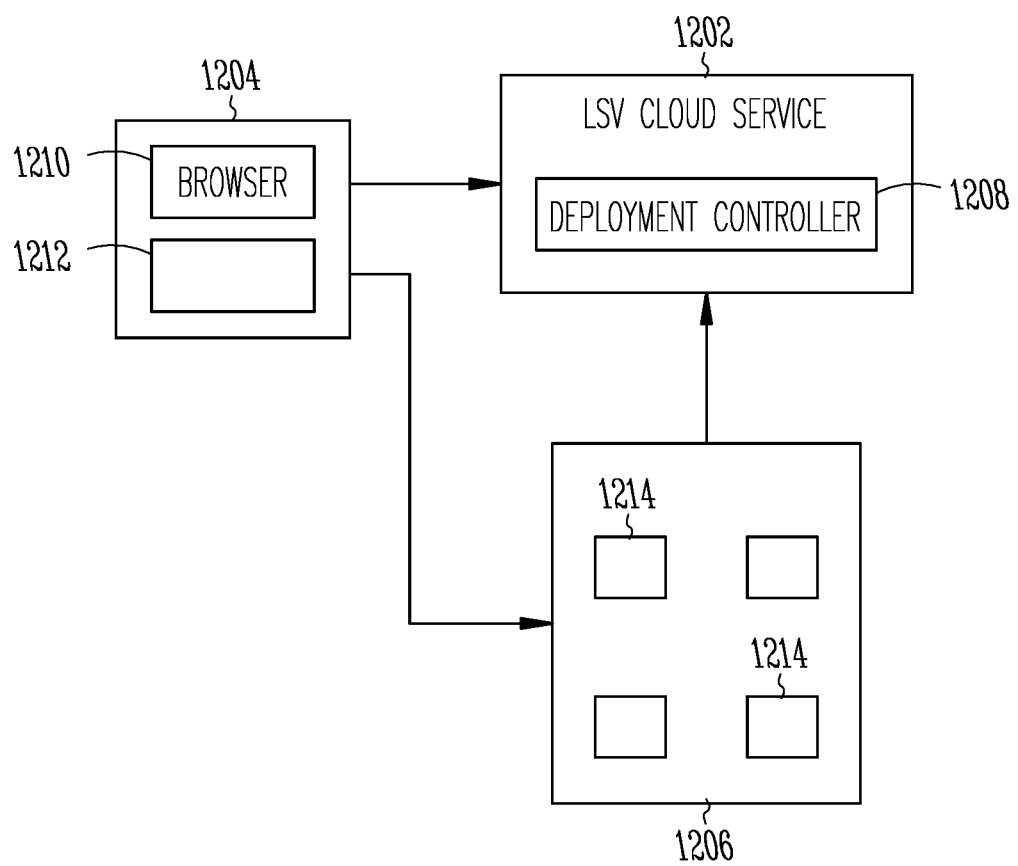
FIG. 12 is an illustrative drawing showing representing an example ISV cloud service system, a client device, and an application repository.

FIG. 12 is an illustrative drawing showing representing an independent software vendor (ISV) cloud service system 1202, a client device 1204 and an application repository 1206. The ISV (independent software vendor) cloud service system 1202 comprises a computing machine configured with program instructions provision the repository 1206 with applications 1214 and to host a deployment controller 1208. The client 1204 comprises an endpoint device 120 that can include tablet computer, a smart phone, a vehicle computer, a navigational device, a portable media device, a smart phone, a desktop computer, a portable media device, or a wearable device (e.g., a smart watch, smart glasses, smart clothing, or smart jewelry), for example. The client 1204 includes web browser 1210 and a hosts DNS request monitor service 1212. The application repository 1206 includes multiple applications 1214 that can be deployed to the client device 1204.

Figure 13:
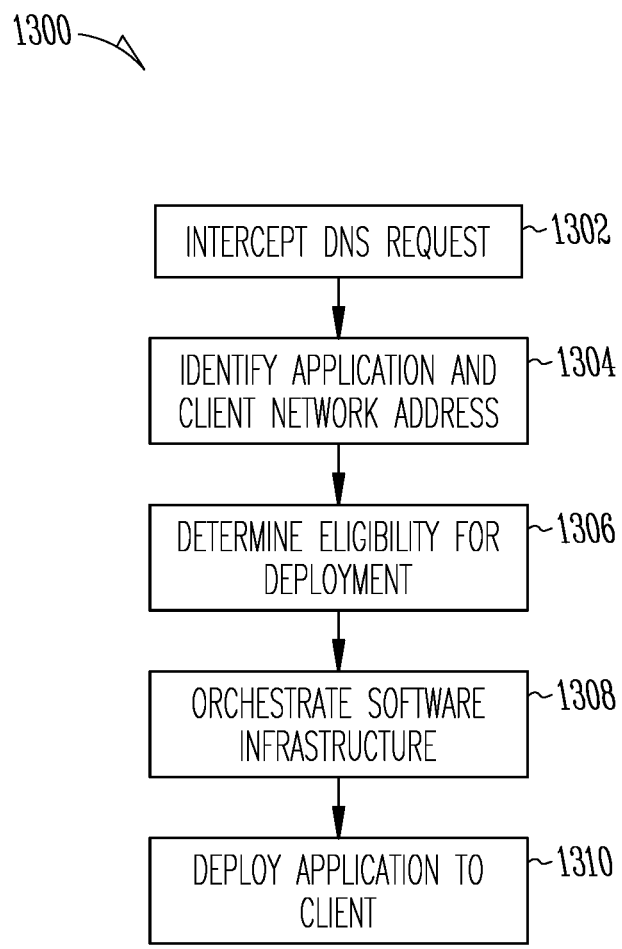
FIG. 13 is an illustrative flow diagram representing an example application deployment process.

FIG. 13 is an example illustrative flow diagram representing an application deployment process 1300. At operation 1302, the DNS request monitor service 1212 intercepts DNS requests by the client 1204. At operation 1304, the DNS request monitor service 1212 sends information over the internet to the deployment controller 1208 running on the cloud service system 1202 that identifies the IP address of the client 1204 and that identifies the application hostname identified in the intercepted DNS request. At operation 1306, the deployment controller 1208 determines whether the identified application is one that is candidate for deployment to the client 1204. More particularly, the deployment controller 1208 references a host application file (not shown) that identifies applications eligible for deployment. In operation 1308, an example deployment controller 1208 causes provisioning of a Kubernetes cluster to the client 1204. In operation 1310, the deployment controller 1208 causes deployment of the application identified in the intercepted DNS request to the provisioned client. More particularly, an example deployment controller 1208 downloads a manifest file (not shown) to the master node of the provisioned Kubernetes cluster, which in turn, manages download of the identified application 1214 from the repository 1206 to a pod (not shown) in the client 1204. A client 1204 can employ the browser 1210 to access the application 1214 running on the client with minimal latency because there is not distance between them. The bowser 1210 and the deployed application on the same computing machine.

Computing Machine

Figure 14:
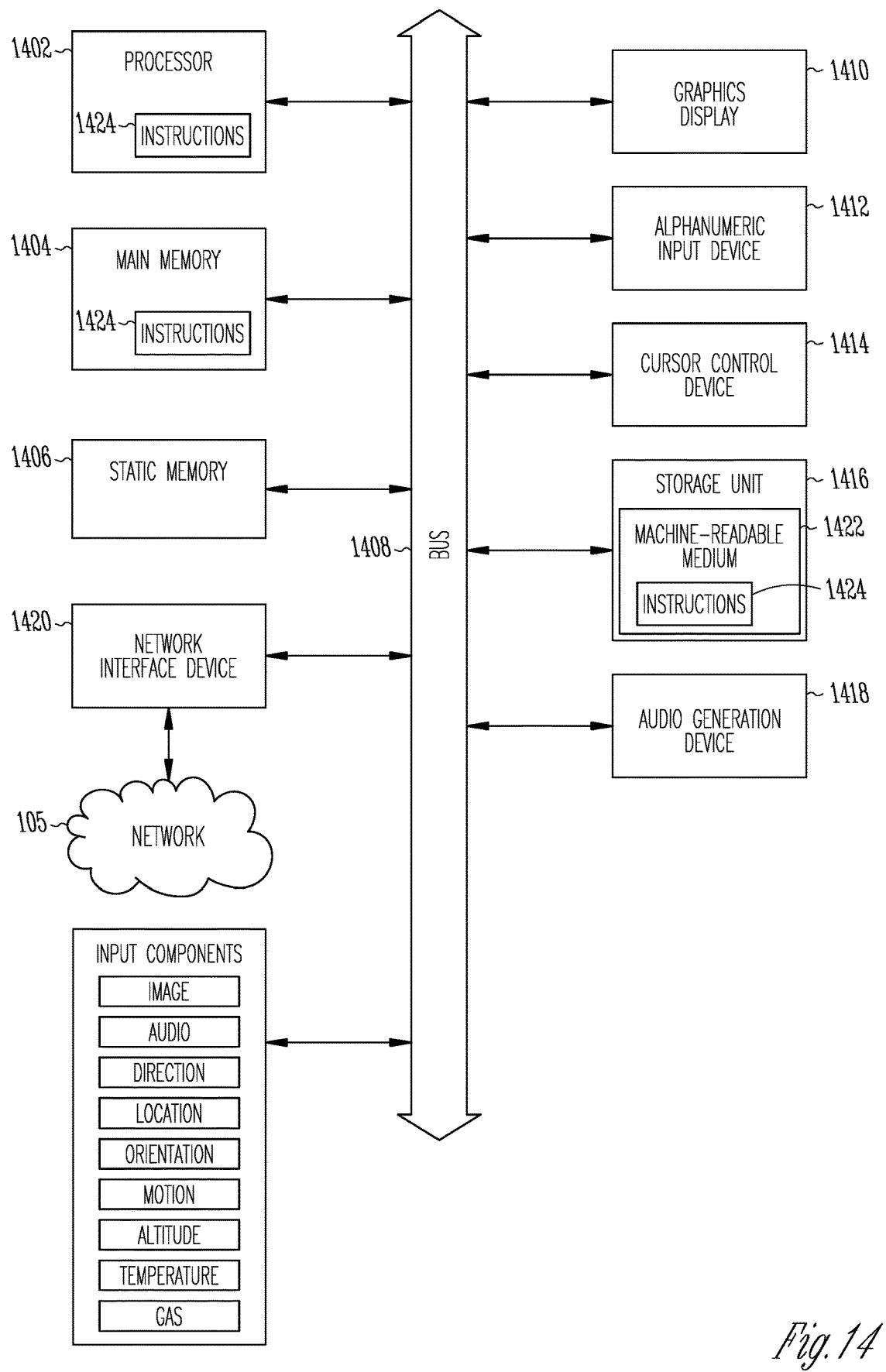
FIG. 14 illustrates components of an example computing machine.

FIG. 14 illustrates components of a computing machine 1400, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 14 shows a diagrammatic representation of the computing machine 1400 in the example form of a computing device (e.g., a computer) and within which instructions 1424 (e.g., software, a program, an application, an applet, an app, or other executable code) for causing the machine 1400 to perform any one or more of the methodologies discussed herein may be executed, in whole or in part.

For example, the instructions 1424 may cause the machine 1400 to execute the flow diagrams of FIGS. 4, 6A, 8, 11A, 11B, and 13. In one embodiment, the instructions 1424 can transform the general, non-programmed machine 1400 into a particular machine (e.g., specially configured machine) programmed to carry out the described and illustrated functions in the manner described.

In alternative embodiments, the machine 1400 operates as a standalone device or may be connected (e.g., networked) to other machines. In a networked deployment, the machine 1400 may operate in the capacity of a server machine or a client machine in a server-client network environment, or as a peer machine in a peer-to-peer (or distributed) network environment. The machine 1400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1424 (sequentially or otherwise) that specify actions to be taken by that machine. Further, while only a single machine is illustrated, the term "machine" shall also be taken to include a collection of machines that individually or jointly execute the instructions 1424 to perform any one or more of the methodologies discussed herein.

The machine 1400 includes a processor 1402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1404, and a static memory 1406, which are configured to communicate with each other via a bus 707. The processor 702 may contain microcircuits that are configurable, temporarily or permanently, by some or all of the instructions 724 such that the processor 1402 is configurable to perform any one or more of the methodologies described herein, in whole or in part. For example, a set of one or more microcircuits of the processor 1402 may be configurable to execute one or more modules (e.g., software modules) described herein.

The machine 1400 may further include a graphics display 1410 (e.g., a plasma display panel (PDP), a light emitting diode (LED) display, a liquid crystal display (LCD), a projector, or a cathode ray tube (CRT), or any other display capable of displaying graphics or video). The machine 1400 may also include an input device 1412 (e.g., a keyboard), a cursor control device 1414 (e.g., a mouse, a touchpad, a trackball, a joystick, a motion sensor, or other pointing instrument), a storage unit 1416, a signal generation device 1418 (e.g., a sound card, an amplifier, a speaker, a headphone jack, or any suitable combination thereof), and a network interface device 1414.

The storage unit 1416 includes a machine-storage medium 1422 (e.g., a tangible machine-readable storage medium) on which is stored the instructions 1424 (e.g., software) embodying any one or more of the methodologies or functions described herein. The instructions 1424 may also reside, completely or at least partially, within the main memory 1404, within the processor 1402 (e.g., within the processor's cache memory), or both, before or during execution thereof by the machine 1400. Accordingly, the main memory 1404 and the processor 1402 may be considered as machine-readable media (e.g., tangible and non-transitory machine-readable media). The instructions 1424 may be transmitted or received over a network 1426 via the network interface device 1420.

In some example embodiments, the machine 1400 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1404, 1406, and/or memory of the processor(s) 1402) and/or storage unit 1416 may store one or more sets of instructions and data structures (e.g., software) 1424 embodying or utilized by any one or more of the methodologies or functions described herein. These instructions, when executed by processor(s) 1402 cause various operations to implement the disclosed embodiments.

As used herein, the terms "machine-storage medium," "device-storage medium," "computer-storage medium" (referred to collectively as "machine-storage medium 1422") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1422 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1422 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1424 may further be transmitted or received over a communications network 1426 using a transmission medium via the network interface device 1420 and utilizing any one of a number of well-known transfer protocols (e.g., HTTP). Examples of communication networks 1426 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1424 for execution by the machine 1400, and includes digital or analog communications signals or other intangible medium to facilitate communication of such software.

In some embodiments, the network interface device 1420 comprises a data interface device that is coupled to one or more of an external camera 1430, an external microphone 1432, and an external speaker 1434 (e.g., external to the machine 1400). The camera 1430 may include a sensor (not shown) configured for facial detection and gesture detection. Any of the camera 1430, microphone 1432, and speaker 1434 may be used to conduct the presentation as discussed herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A system to control deployment of a server application over a network comprising:
    a first computing environment;
    a second computing environment; and
    wherein the first computing environment comprising one or more processor and memory, is configured with first program instructions when executed by the one or more processor to perform first operations including:
        capturing an identifier of the server application included in a message that is sent by a client application over a wireless carrier network and received at a base station and that is sent from the base station over an interface with the network to a server hosted on the network;
        determining whether the identified server application is deployed to an edge node co-located with the base station; and
        based upon a determination that the identified server application is not deployed to the edge node co-located with the base station, sending information over the network to a second computing environment, that identifies a network address of the edge node co-located with the base station;
    wherein the second computing environment comprising one or more processor and memory, is configured with second program instructions when executed by the one or more processor to perform second operations, including:
        in response to the information that identifies the network address of the edge node co-located with the base station,
        causing provisioning of the edge node having the identified network address to receive the requested server application; and
        causing download of the requested server application to the provisioned edge node having at the identified network address.

2. The system of claim 1,
wherein the server hosted on the network includes a DNS server: and
wherein capturing the identifier included in the client application message includes using a DNS server co-located with the base station to capture the identifier.

3. The system of claim 1,
wherein the server hosted on the network includes an instance of the identified server application; and
wherein capturing the identifier included the client application message includes using a proxy server co-located with the base station to capture the identifier.

4. The system of claim 1,
wherein the second computing environment is configured with second program instructions to perform second operations that further include:
determining whether the requested server application is included in a list of applications that are to be deployed upon request.

5. The system of claim 1,
wherein the second computing environment is further configured with the second program instructions to perform second operations that further include:
updating a DNS record to include the identified network address of the edge node.

6. The system of claim 1,
wherein the first computing environment includes the edge node.

7. The system of claim 1,
wherein the first computing environment includes at least one of a hardware computing machine, a virtual machine and a container; and
wherein the second computing environment includes at least one of a hardware computing machine, a virtual machine and a container.

8. A system to control deployment of a server application over a network based upon a client application request received at a wireless base station for a connection with the server application comprising:
a first computing environment; and
a second computing environment;
wherein the first computing environment comprising one or more processor and memory, is configured with first program instructions when executed by the one or more processor to perform first operations, including:
receiving the client application request for a connection with the server application over the network from a gateway server co-located with the base station;
identifying a network address of an edge node co-located with the wireless base station, based upon geographic information associated with the gateway server; and
determining whether the identified server application is deployed to an edge node co-located with the base station;
based upon a determination that the identified server application is not deployed to the edge node co-located with the base station, sending information over the network to the second computing environment that identifies the network address of the edge node;
wherein the second computing environment comprising one or more processor and memory, is configured with second program instructions when executed by the one or more processor to perform second operations, including:

in response to the information that identifies the network address of the edge node co-located with the base station,
causing provisioning of the edge node having the identified network address to receive the requested server application; and
causing download of the requested server application to the provisioned edge node having the identified network address.

9. The system of claim 8,
wherein the second computing environment is configured with the second program instructions to perform operations that further include: updating a DNS record to include the identified network address of the edge node.

10. The system of claim 8,
wherein the first computing environment includes at least one of a hardware computing machine, a virtual machine and a container; and
wherein the second computing environment includes at least one of a hardware computing machine, a virtual machine and a container.

11. A method to control deployment of a server application over a network comprising:
using a first computing environment to,
capture an identifier of the server application included in a message that is sent by a client application over a wireless carrier network and received at a base station and that is sent from the base station over an interface with the network to a server hosted on the network;
determine whether the identified requested server application is deployed to an edge node co-located with the base station; and
based upon a determination, that the server application is not deployed to the edge node co-located with the base station, sending information over the network to a second computing environment, that identifies a network address of the edge node co-located with the base station;
using the second computing environment to,
in response to the information that identifies the network address of the edge node co-located with the base station,
cause provisioning of the edge node at the identified network address to receive the requested server application; and
causing download of the requested server application to the provisioned edge node having at the identified network address.

12. The method of claim 11,
wherein the server hosted on the network includes a DNS server: and
wherein capturing the identifier included in the client application message includes using a DNS server co-located with the base station to capture the identifier.

13. The method of claim 11,
wherein the server hosted on the network includes an instance of the identified server application; and
wherein capturing the identifier included the client application message includes using a proxy server co-located with the base station to capture the identifier.

14. The method of claim 11, further including:
determining using the first computing environment, whether the server application is included in a list of applications that are to be deployed upon request.

15. The method of claim 11, further including:
causing, using the second computing environment, updating a DNS record to include the identified network address of the edge node.

16. The method of claim 11,
wherein the first computing environment includes the edge node.

17. A system to control deployment of a server application over a network in response to a client application request sent over the network received at a wireless base station to access the server application comprising:
a client computing machine coupled to the network;
a cloud-based service computing machine coupled to the network;
wherein the client computing machine comprising one or more processor and memory, is configured with program instructions when executed by the one or more processor to cause the client computing machine to perform client operations, including:
hosting a client application;
intercepting a DNS request, made by the client application, that requests access to a server application identified in the DNS request;
sending an access request over the network to the cloud-based service computing machine, that identifies the requested server application and that identifies a network address of the client machine; running the server application on the client computing machine after the server application is deployed to the client computing machine;
hosting a web browser;
accessing the server application through the web browser after the server application is deployed to and running on the client computing machine;
wherein the cloud-based service computing machine comprising one or more processor and memory, is configured with program instructions when executed by the one or more processor to cause the cloud-based service computing machine to perform access request operations, including:
capturing the access request, received over the network from the client computing machine, via the wireless base station, for access to the server application;
identifying the requested server application and identifying a network address of the client machine that sent the request to access the requested server application, based upon content of the captured access request; and
based upon the identification of the requested server application and the identification of the network address of the client machine,
causing provisioning of the client machine having the identified network address to receive the requested server application; and
causing download of the requested server application over the network from an application repository to the provisioned client machine at the identified network address.

18. The system of claim 17,
wherein the access request operations further include determining whether the requested server application is included in a list of server applications that are to be deployed upon request.

19. The system of claim 17,
wherein the deployment of the requested server application over the network from an application repository to the client computing machine at the identified network address further includes:
causing provisioning of the client machine to receive the requested server application; and
causing download of the requested server application to the client machine.

20. A method to control deployment of a server application over a network based upon a client application message received at a wireless base station comprising:
using a first computing environment to,
receive a client application message sent using a gateway server co-located with the base station to an instance of the server application hosted on the network from;
determine a network address of an edge node co-located with the base station, based upon geographic information associated with the gateway server; and
send information over the network to a second computing environment that identifies the network address of the edge node co-located with the base station; and
using the second computing environment to,
in response to the information that identifies the network address of the edge node co-located with the base station,
cause, using the second computing environment, provisioning of the edge node having the identified network address to receive the requested server application; and
cause, using the second computing environment, download of the requested server application to the provisioned edge node having the identified network address.

21. The method of claim 20, further including:
updating a DNS record at a DNS server to include the identified network address of the edge node.

* * * * *

UNITED STATES PATENT AND TRADEMARK OFFICE
CERTIFICATE OF CORRECTION

| | |
|---|---|
| PATENT NO. | : 11,936,757 B1 |
| APPLICATION NO. | : 17/740348 |
| DATED | : March 19, 2024 |
| INVENTOR(S) | : Benny et al. |

It is certified that error appears in the above-identified patent and that said Letters Patent is hereby corrected as shown below:

In the Claims

In Column 21, Line 3, in Claim 2, delete "server:" and insert --server;-- therefor In Column 22, Line 13, in Claim 9, after "include:", insert a linebreak In Column 22, Line 54, in Claim 12, delete "server:" and insert --server;-- therefor In Column 23, Line 28, in Claim 17, after "machine;", insert a linebreak Signed and Sealed this
Twenty-eighth Day of May, 2024

Katherine Kelly Vidal
*Director of the United States Patent and Trademark Office*